J. F. MOFFETT.
PLOW ATTACHMENT.
APPLICATION FILED JULY 5, 1917.
1,266,035.
Patented May 14, 1918.
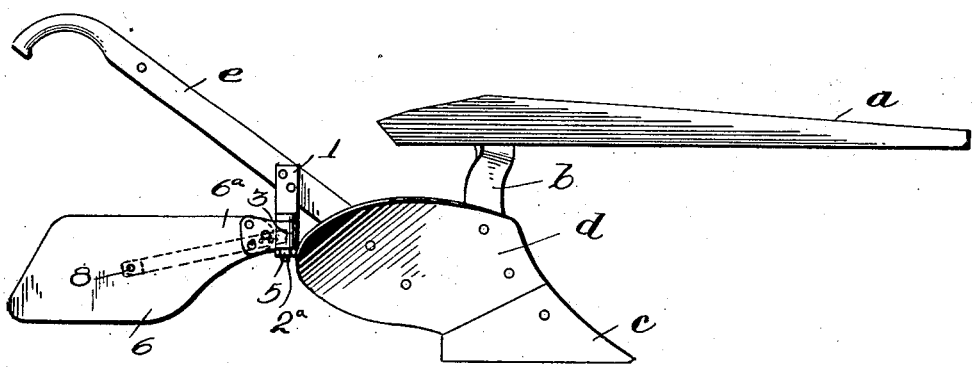
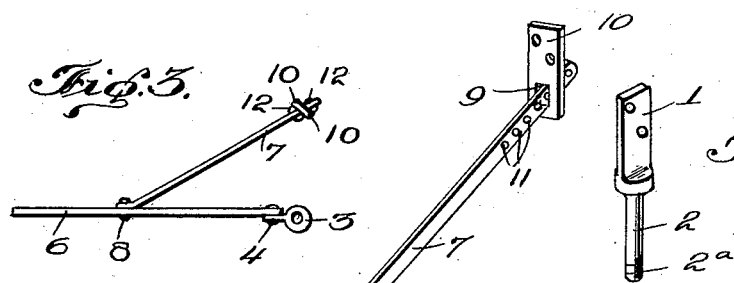
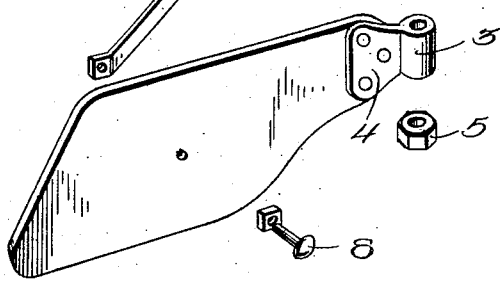
WITNESSES
INVENTOR
James F Moffett
BY
ATTORNEY

UNITED STATES PATENT OFFICE.

JAMES F. MOFFETT, OF WEST NEWTON, PENNSYLVANIA.

PLOW ATTACHMENT.

1,266,035.   Specification of Letters Patent.   Patented May 14, 1918.

Application filed July 5, 1917. Serial No. 178,759.

*To all whom it may concern:*

Be it known that I, JAMES F. MOFFETT, a citizen of the United States, residing at West Newton, in the county of Westmoreland and State of Pennsylvania, have invented certain new and useful Improvements in Plow Attachments, of which the following is a specification.

This invention relates to plow attachments and more particularly to an attachment for a plow for preventing the soil from falling back into the furrow during the plowing operation.

One of the main objects of the invention is to provide a simple and efficient attachment for a plow which will act to prevent the soil from falling back into the furrow, this attachment being so constructed as to be readily applied to a plow of standard construction. A further object is to provide a deflecting member or plate which may be hingedly secured to a plow for angular adjustment about a vertical axis, means being provided for holding the plate securely in adjusted position. Further objects will appear from the detailed description.

In the drawings:—

Figure 1 is a side view of a plow with an attachment constructed in accordance with my invention applied;

Fig. 2 is a perspective view of the attachment and the securing means therefor in disassembled condition.

Fig. 3 is a top plan view of the attachment and the bracing means therefor.

Fig. 4 is a fragmentary side view of the plow taken from the side opposite to Fig. 1 to show the plate for connecting the adjusting and brace bar to the plow handle.

The plow is provided with the usual beam $a$, standard $b$, share $c$, moldboard $d$, and handles $e$. This plow may be of any suitable standard construction and need not, therefore, be further described in detail.

A plate 1 is fixedly secured to one of the plow handles $e$ adjacent the rear edge of moldboard $d$. This plate is provided with an integral downwardly directed stud 2 the lower portion of which is threaded as at $2^a$. This stud is adapted to fit loosely through a sleeve 3 formed integral with a base plate 4, a suitable nut 5 being threaded on the lower end of stud 2 so as to secure the sleeve 3 loosely on the same. Base plate 4 is fixedly secured to the forward upper corner $6^a$ of a deflecting plate 6 of irregular polygonal shape which is disposed in vertical position. A stay rod 7 is pivotally secured at its rearward end to the plate 6 at the approximate center thereof, as at 8. This rod is loosely inserted through an opening 9 in a rectangular plate 10 which is fixedly secured to the other handle $e$ of the plow. The forward portion of stay rod 7 is provided with a plurality of apertures 11 disposed in spaced relation longitudinally of the rod. These apertures are adapted to receive suitable securing pins 12 inserted through the same, adjacent each face of plate 10. By this means stay rod 7 may be easily secured against longitudinal movement so as to rigidly hold the deflecting plate 6 in angular adjustment about the stud 2. By inserting the pins 12 in suitable apertures 11, selectively, the effective length of the stay rod may be quickly and easily varied thus providing means whereby the plate 6 may be readily adjusted about stud 2.

In using this attachment, the plate 6 will be positioned closely adjacent the rearward end of the moldboard $d$. As the soil is discharged from the moldboard it will flow rearwardly of the plow, being turned outwardly away from the plow so as to leave a clean furrow and a clear cut, provided the soil is in proper condition and the plow works properly. It often happens, however, that due to the condition of the soil, or other causes, the soil falls back into the cut made by the plow thus seriously interfering with the plowing operation. By properly adjusting the deflector 6, this soil which falls back into the cut will be deflected laterally of the plow onto the furrow which has been turned, thus leaving an unobstructed path for the plowman. The angle at which the plate 6 is set will, of course, vary in accordance with the particular type of plow used, the condition of the soil being plowed, and other circumstances which will have to be determined in each individual case. The attachment can be readily applied to any plow of the walking type, and may be quickly and easily adjusted to suit the circumstances of the particular case in the manner above described.

What I claim is: — .

1. The combination with a plow having a mold board and handles, of a deflecting plate pivotally supported by one of said handles in rear of the mold board for adjustment about a vertical axis, and means for adjusting said plate and for securing it in adjustment.

2. The combination with a plow having a moldboard, and handles, of a deflecting plate carried by said handles in rear of the moldboard and adjustable transversely of the plow for directing soil engaged by said plate laterally of said plow.

3. The combination with a plow having a moldboard and handles, of a deflecting plate pivotally secured to one of said handles so as to be adjustable about a vertical axis, said deflecting plate being positioned rearwardly of the moldboard, and means for adjusting the deflecting plate about its pivotal axis and for bracing the same so as to maintain it rigidly in adjustment.

4. An attachment for a walking plow comprising a deflecting plate provided at one end with a bearing sleeve, a plate adapted to be secured to one handle of a plow and provided with a depending stud adapted to be inserted through said bearing sleeve so as to pivotally secure the deflecting plate to the plow handle for adjustment about a vertical axis, a stay rod pivotally secured at one end to the plate intermediate the ends thereof, a plate adapted to be secured to the other handle of the plow and provided with a slot for slidably receiving said stay rod, and means for adjustably securing the stay rod through said last mentioned plate.

In testimony whereof I affix my signature in presence of two witnesses.

JAMES F. MOFFETT.

Witnesses:
 ROBERT N. TIMMS,
 H. E. GOEHRING.

Copies of this patent may be obtained for five cents each, by addressing the "Commissioner of Patents, Washington, D. C."